(12) United States Patent
Nateghi et al.

(10) Patent No.: US 10,766,100 B2
(45) Date of Patent: Sep. 8, 2020

(54) HYBRID ELECTROSLAG CLADDING

(71) Applicant: LINCOLN GLOBAL, INC., Santa Fe Springs, CA (US)

(72) Inventors: Amin Nateghi, Dortmund (DE); Roland Pollmann, Velbert (DE); Frank Bolte, Essen (DE); Christopher Thume, Iserlohn (DE); Mark Golding, Hampshire (GB); Zhuyao Zhang, Surrey (GB); Pallav Chattopadhyay, Essen (DE)

(73) Assignee: Lincoln Global, Inc., Santa Fe Springs, CA (US)

( * ) Notice: Subject to any disclaimer, the term of this patent is extended or adjusted under 35 U.S.C. 154(b) by 334 days.

(21) Appl. No.: 15/737,689

(22) PCT Filed: Nov. 26, 2015

(86) PCT No.: PCT/IB2015/002224
§ 371 (c)(1),
(2) Date: Dec. 18, 2017

(87) PCT Pub. No.: WO2016/203286
PCT Pub. Date: Dec. 22, 2016

(65) Prior Publication Data
US 2018/0178317 A1   Jun. 28, 2018

(30) Foreign Application Priority Data

Jun. 19, 2015  (DE) .................... 20 2015 004 355 U
Nov. 10, 2015  (DE) .................... 20 2015 007 709 U

(51) Int. Cl.
B23K 25/00   (2006.01)
B23K 35/30   (2006.01)
(Continued)

(52) U.S. Cl.
CPC ........ B23K 25/005 (2013.01); B23K 35/0255 (2013.01); B23K 35/0261 (2013.01);
(Continued)

(58) Field of Classification Search
CPC ............. B23K 25/005; B23K 35/3033; B23K 35/0261; B23K 35/0266; B23K 35/0255;
(Continued)

(56) References Cited

U.S. PATENT DOCUMENTS 10,046,419 B2 *  8/2018  Denney ................. B23K 26/14
10,105,780 B2 * 10/2018  Ash ....................... B23K 26/24
2013/0004674 A1   1/2013  Golding

FOREIGN PATENT DOCUMENTS

CN   102873466 A   1/2013
CN   104588912 A   5/2015
(Continued)

OTHER PUBLICATIONS

Dilthey et al., Modification of the Electroslag Process Opens Up Possibilities With Regard to Weld Surfacing, Welding and Cutting DVS. vol. 5. No. 4. Jan. 1, 2006, pp. 215-220.
(Continued)

*Primary Examiner* — David J Walczak

(57) ABSTRACT

A hybrid electroslag cladding method includes the steps of: providing a workpiece (6) to be cladded; guiding a strip electrode (4) onto the surface of the workpiece (6); cladding the strip electrode (4) onto the surface of the workpiece (6) using electroslag cladding; guiding a metal cored hybrid electroslag cladding wire (7) into the weld puddle (9) of the strip electrode (4) for controlling the chemical composition of the cladding.

12 Claims, 3 Drawing Sheets

(51) Int. Cl.
- *B23K 35/02* (2006.01)
- *C22C 38/44* (2006.01)
- *C22C 38/48* (2006.01)
- *C22C 38/58* (2006.01)
- *C22C 19/05* (2006.01)
- *C22C 19/03* (2006.01)
- *C22C 38/40* (2006.01)
- *C22C 38/00* (2006.01)
- *C22C 38/02* (2006.01)
- *C22C 38/04* (2006.01)
- *C22C 38/06* (2006.01)
- *C22C 38/42* (2006.01)
- *C22C 38/50* (2006.01)

(52) U.S. Cl.
CPC .......... *B23K 35/0266* (2013.01); *B23K 35/30* (2013.01); *B23K 35/308* (2013.01); *B23K 35/3033* (2013.01); *B23K 35/3066* (2013.01); *B23K 35/3086* (2013.01); *C22C 19/03* (2013.01); *C22C 19/05* (2013.01); *C22C 19/055* (2013.01); *C22C 19/058* (2013.01); *C22C 38/002* (2013.01); *C22C 38/02* (2013.01); *C22C 38/04* (2013.01); *C22C 38/06* (2013.01); *C22C 38/40* (2013.01); *C22C 38/42* (2013.01); *C22C 38/44* (2013.01); *C22C 38/48* (2013.01); *C22C 38/50* (2013.01); *C22C 38/58* (2013.01)

(58) Field of Classification Search
CPC .. B23K 35/308; B23K 35/30; B23K 35/3066; B23K 35/3086; B23K 9/173; B23K 9/18; B23K 9/04; B23K 9/12; B23K 9/16; C22C 38/44; C22C 38/48; C22C 38/58; C22C 19/05; C22C 19/03; C22C 19/055; C22C 38/40; C22C 19/058; C22C 38/002; C22C 38/02; C22C 38/04; C22C 38/06; C22C 38/42; C22C 38/50

See application file for complete search history.

(56) References Cited

FOREIGN PATENT DOCUMENTS

| | | |
|---|---|---|
| DE | 10 2007 006 688 B4 | 10/2011 |
| JP | 1975008749 A | 1/1975 |
| JP | S57-085686 A | 5/1982 |
| JP | 2003-501557 A | 1/2003 |
| JP | 2014-518160 A | 7/2014 |
| WO | 2013/011361 A1 | 1/2013 |
| WO | 2014/026698 A1 | 2/2014 |

OTHER PUBLICATIONS

International Search Report dated Apr. 22, 2016, for International Application No. PCT/IB2015/002224.

\* cited by examiner

HYBRID ELECTROSLAG CLADDING

CROSS-REFERENCE TO RELATED APPLICATIONS/INCORPORATION BY REFERENCE

This application is a 371 national phase of International Application No. PCT/IB2015/002224, filed Nov. 26, 2015, which claims priority to German Application No. 20 2015 004 355.0, filed Jun. 19, 2015, and 20 2015 007 709.9, filed Nov. 10, 2015, each of which applications is incorporated herein by reference in its entirety.

TECHNICAL AREA

The invention relates to electroslag cladding. More specifically, the invention relates to hybrid electroslag cladding systems, methods and consumables. Still more particularly, the invention relates to a hybrid electroslag cladding method, a metal cored hybrid electroslag cladding wire, and a hybrid electroslag cladding system and to a use of the metal cored hybrid electroslag cladding wire.

PRIOR ART

Cladding is a well established overlay welding technique that provides a layer of alloyed steel onto the surface of a metal device for, inter alia, wear and corrosion protection. For instance, pressure vessels are exposed to corrosive media under high pressure and high temperatures and generally require a cladding layer. Other example devices to which protective cladding layers are applied include reactors, heat exchangers and separators.

The cladding has to meet specific requirements depending on the intended use of the device. Typically, the deposited weld overlay grade is prescribed by engineering companies that design the device. Some examples are: Nickel Base Alloy 400, 600, 625, 825, and others, and Stainless Steel SS 308L, 316L, 317L, 347, Duplex, Super Duplex, and others. The grade requirements differ; for instance, when cladding Nickel Base Alloy 625 in Carbon steel or low-alloyed steel, a low Fe content <5 wt % is a major requirement, and when cladding e.g. Stainless Steel SS347 on carbon steel or low alloyed steel, different stainless steel chemistry is required depending on the application.

In practice, it is challenging to achieve the required grades and chemistries, as dilution of the deposited alloyed material with the typically unalloyed or low alloyed base metal will occur. This makes it currently costly or sometimes even impossible to provide the required chemistry in a fast process.

The current state of the art comprises numerous cladding techniques.

The submerged-arc strip cladding process uses an arc and generally requires several layers to achieve specified requirements, see e.g. "Submerged-arc strip cladding of continuous casting rollers [ . . . ]", in: Svetsaren nr 1, 2001, pages 17 to 19.

The electroslag process has been used with a strip electrode and a flux-cored wire ("Modification of the electroslag process opens up possibilities with regard to weld surfacing", in: Welding and Cutting 5 (2006) No. 4, pages 215 to 220), however, for the purpose of Hardfacing rather than corrosion resistant cladding and with chemical compositions in the hardfacing layer which are incompatible with typical weld overly grades for corrosion resistant cladding. Hardfacing is the method of weld overlay of hard facing material for mechanical wear resistance. This is mainly used in the cement, mining and steel industry.

Other processes exist, however, all known processes fail to provide a fast and preferably single pass cladding layer deposition that reliably meets the typical weld overlay grade requirements and/or desired stainless steel chemistry.

DESCRIPTION OF THE INVENTION

The object of the invention is thus to provide a hybrid electroslag cladding method, a metal cored hybrid electroslag cladding wire, a use of the metal cored hybrid electroslag cladding wire, and a hybrid electroslag cladding system, that allow the fast deposition of a single cladding layer that meets high overlay grades with respect to the desired cladding chemistry.

The invention thus provides hybrid electroslag cladding, i.e. arcless cladding with both a strip electrode and an alloyed metal cored wire, that allows very fast (typically >27 cm/min) cladding of a preferably single cladding layer of desired thickness (typically 4.5 to 5.5 mm) and that meets the typical weld overlay grade chemical requirements (e.g. Fe<5 wt % for Nickel Base Alloy 625).

The invention provides a hybrid electroslag cladding method, comprising: providing a workpiece to be cladded; guiding a strip electrode onto the surface of the workpiece; cladding the strip electrode onto the surface of the workpiece using electroslag cladding; and guiding a metal cored hybrid cladding wire into the weld puddle of the strip electrode for controlling the chemical composition of the cladding.

The use of a metal cored wire in the arcless cladding process allows a precise control of the cladding chemistry with a fast cladding speed of about 25 cm/min, preferably above, and more preferably about 27 cm/min for Nickel alloys and about 33 cm/min for stainless steel alloys, with a cladding layer thickness of about 5 mm, preferably in the range between 4.5 and 5.5 mm.

When cladding a nickel based workpiece, both the strip electrode and a metal cored hybrid electroslag cladding wire may be selected for controlling the chemical composition of the cladding.

When cladding stainless steel based workpieces, the invention allows to use the same cladding strip for different steel grades, and only the metal cored hybrid electroslag cladding wire needs to be changed according to the desired cladding chemistry.

For both, Nickel and Stainless Steel, only one flux can be used for all Stainless steel grades and one flux can be used for all Nickel alloy grades.

The inventive method thus not only provides fast cladding with precise control of the cladding chemistry, but additionally minimizes complexity by reducing the number of different consumables that need to be provided.

Cladding parameters may be controlled by a controller, preferably a programmable logic controller (PLC), reliable process stability. Prior art cladding technology does not normally use such controllers. The controller may be connected to sensors and controls at least one of the following parameters: the stickout length of the metal cored hybrid electroslag cladding wire, the feed speed of the strip electrode, the feed speed of the metal cored hybrid electroslag cladding wire.

The use of a programmable logic controller allows a very precise control of the cladding chemistry. The invention thus provides, as an example, to change the feed speed of the metal cored hybrid electroslag cladding wire automatically if a change of the feed speed of the strip electrode is detected. For instance, if the strip electrode feed slows down temporarily, the controller will slow down the feed speed of the metal cored hybrid electroslag cladding wire automatically to ensure the same chemical composition throughout the process. The inventive use of a controller thus results in a precise ratio of deposition from strips and metal cored wires as selected and ensures homogeneity and uniformity in the final cladding chemistry.

The use of a controller further ensures precise control of pre-selected welding parameters for Strike Start, and/or Welding Crater and/or their Slope conditions. The electrical stickout control may also be provided through the controller.

The metal cored hybrid cladding wire is preferably heated in order to control the deposition rate. The heat control is preferably effected with the controller.

More specifically, in the Nickel Base aspect, the invention provides a metal cored hybrid cladding wire with a Ni—Cr nickel base sheath and a metal powder flux within the Ni—Cr nickel base sheath, wherein the wire has a composition of WIRE 625, WIRE 600, WIRE 825, or WIRE 400, as specified in the tables hereinbelow.

In the Stainless Steel Base aspect, the invention provides a Ni—Cr stainless steel base sheath and a metal powder flux within the stainless steel base sheath, wherein the wire has a composition of WIRE 308L, WIRE 347, WIRE 316L, or WIRE 317L, as specified in the tables hereinbelow.

The upper limit of at least one of the elements or of all elements may be 5%, 10% or 20% lower than specified in the corresponding table. The lower limit of at least one of the elements or of all elements may be 5%, 10% or 20% higher than specified in the corresponding table.

The metal cored hybrid cladding wire is used for electroslag cladding of carbon/low alloy black steel together with a strip electrode, and preferably electroslag powder flux. The strip electrode and the flux may be of ordinary composition as the chemistry of the cladding layer is controlled by the wire, in the stainless steel aspect of the invention. It is not required to provide different strip electrodes or fluxes for the specific process, base material or desired weld overlay grade.

The invention further provides a cladding system comprising a cladding head and a cladding power supply, the cladding head guiding a strip electrode onto a surface of a workpiece to be cladded with the strip electrode, the cladding power supply providing power to the strip electrode for arcless deposition onto the surface of the workpiece, the cladding head guiding a metal cored hybrid cladding wire into the weld puddle of the strip electrode, the system further preferably comprising a flux feeder for deposition of flux on the strip electrode. The cladding system is hybrid in that it deposits a metal cored hybrid cladding wire into the puddle of a strip electrode for control of the chemistry of the cladding layer.

The cladding system may comprise a hot wire power supply for heating the metal cored hybrid electroslag cladding wire, and/or a controller, preferably a programmable logic controller, for controlling at least one of the following parameters: the heat of the metal cored hybrid electroslag cladding wire according to a desired deposition rate, the stickout length of the strip and/or metal cored hybrid electroslag cladding wire, the feed speed of the strip electrode, the feed speed of the metal cored hybrid electroslag cladding wire.

Preferably, the cladding system comprises a hot wire power supply for heating the metal cored hybrid cladding wire, and a controller for controlling the heat of the metal cored hybrid cladding wire according to a desired deposition rate.

The cladding system may additionally comprise a magnet steering device adjacent the strip electrode for steering the weld puddle magnetically.

The angle between the strip electrode and/or the metal cored hybrid cladding wire and the surface of the workpiece may be adjustable.

The cladding head guides one, two, three or more adjacent metal cored hybrid cladding wires into the weld puddle. The wires are preferably identical or at least of equal diameter and spaced such that they cover the width of the strip electrode.

Further features and embodiments of the invention are inferable from the ensuing description, drawings and claims.

DETAILED DESCRIPTION OF EMBODIMENTS

Embodiments of the inventive systems, methods and wires are discussed in more detail.

System

Figure 1:
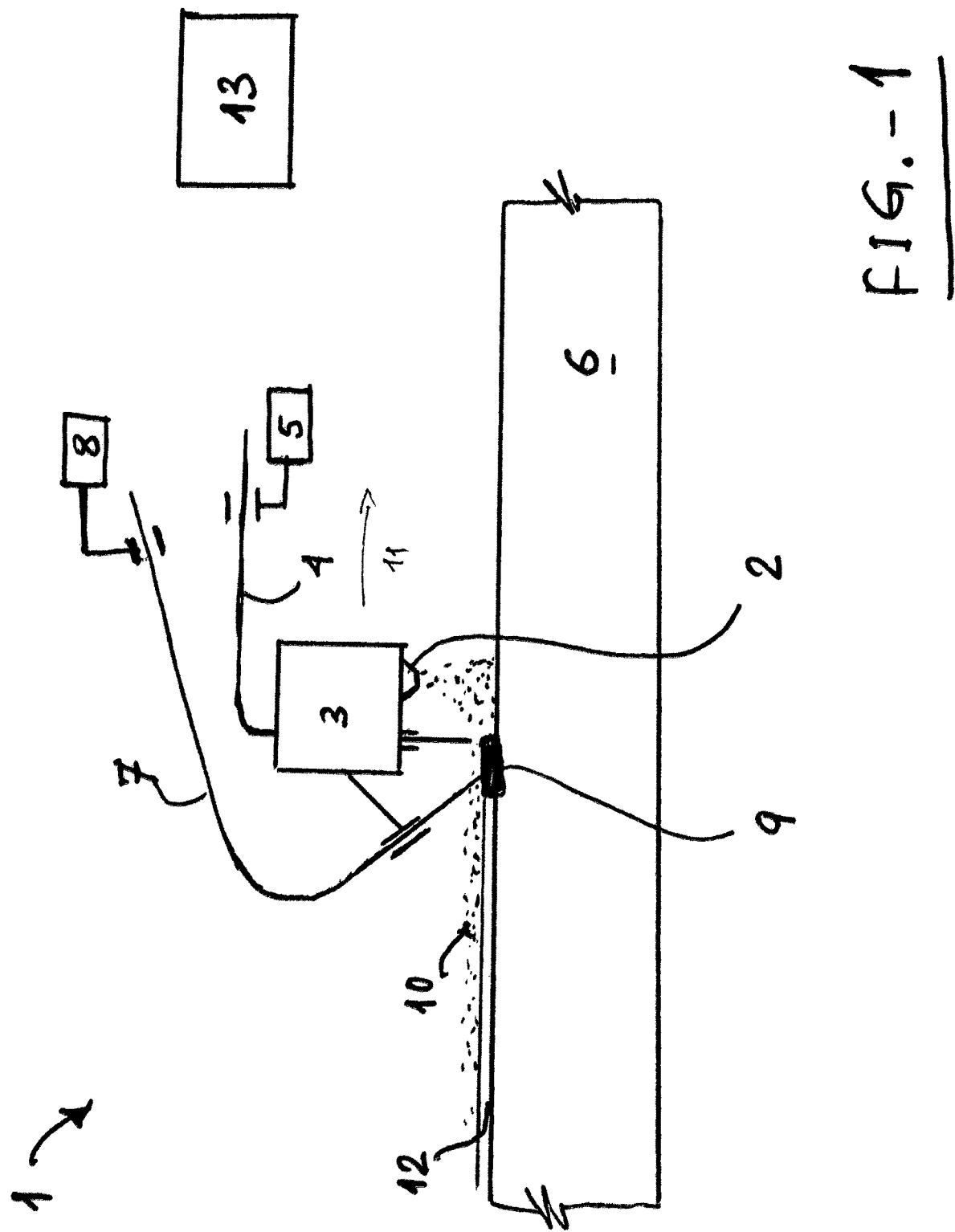
FIG. 1 illustrates a hybrid cladding system.

FIG. 1 illustrates a cladding system 1 having a flux feeder 2 and a cladding head 3 which guides both, a strip electrode 4 powered by a cladding power supply 5 onto a surface of a workpiece 6, as well as a metal cored hybrid cladding wire 7 heated by a hot wire power supply 8 into the weld puddle 9 of the strip electrode 4.

The strip electrode 4 covered by flux 10 is deposited onto the surface of the workpiece 6 by means of an arcless electroslag process for cladding the workpiece 6 while the cladding 3 head moves along the workpiece 6 in the direction of arrow 11. Both the strip electrode 4 and the surface of the workpiece 6 melt and form the weld puddle 9 which solidifies after a period of time. Prior to solidification, the metal cored hybrid cladding wire 7 is fed into the weld puddle 9. The wire 7 melts and mixes with the weld puddle 9, controlling the chemical composition of the resulting cladding layer 12.

A controller 13 for controlling the heat of the metal cored hybrid cladding wire 7 according to a desired deposition rate, the movement of the cladding head 3, and the cladding power supply 5, is preferably provided. The controller 13 may be connected to the powers supplies 5, 8 and the welding head 3 as well as strip and wire feeders (not depicted) by wire connection, via a network and/or wirelessly.

Figure 2:
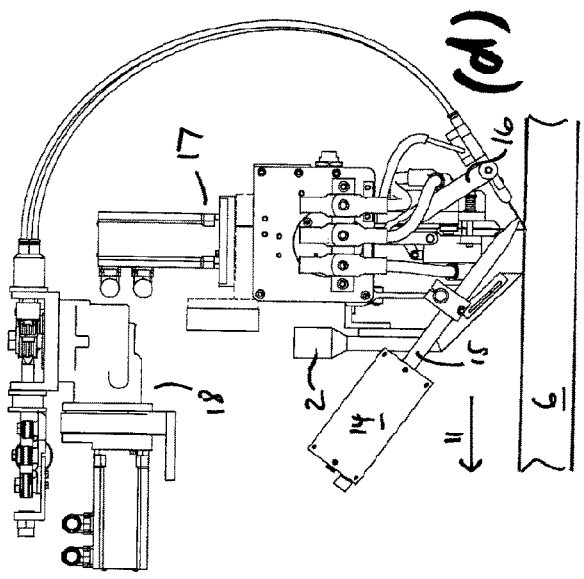
FIG. 2 shows a cladding head in (a) a 3D-view, (b) a left view, (c) a front view, (d) a right view, (e) a rear view, and (f) an enlarged detail from the encircled region of FIG. 2(a).
Figure 2:
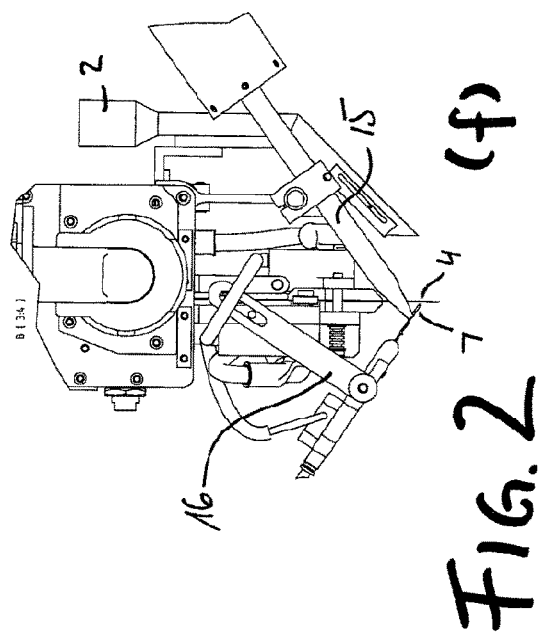
Figure 2:
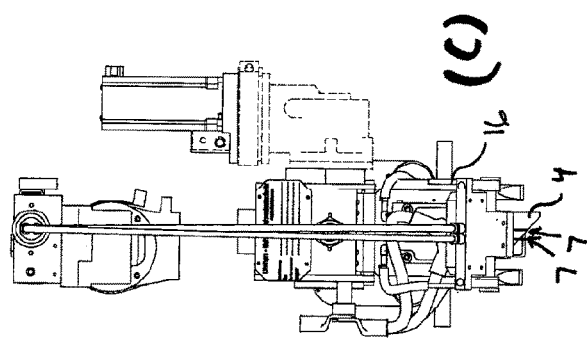
Figure 2:
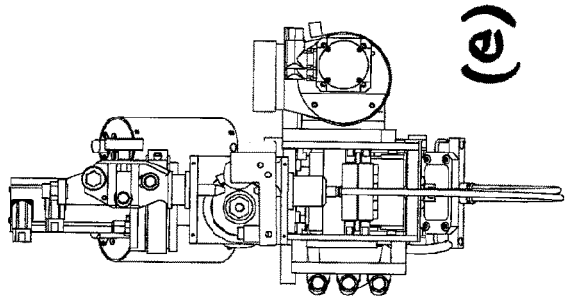
Figure 2:
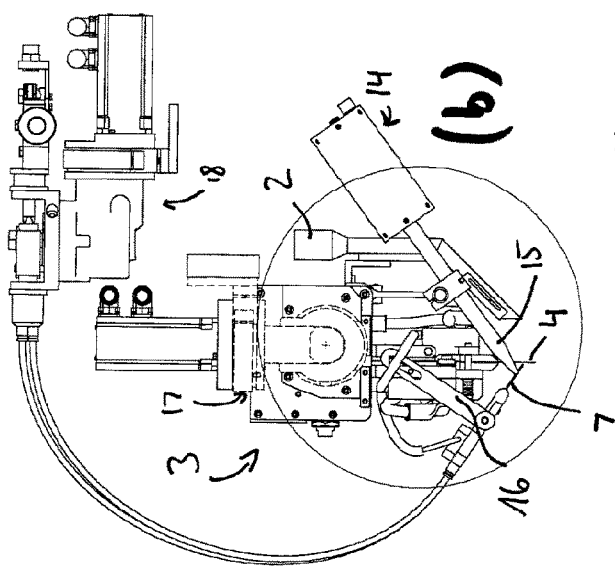
Figure 2:
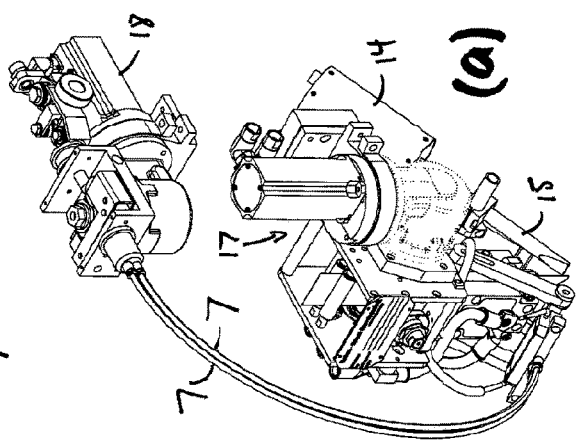

The flux feeder 2 is preferably attached to the cladding head 3 and filled with flux for electroslag cladding, see FIG. 2 showing an embodiment with two metal cored hybrid cladding wires 7.

In a preferred embodiment, the cladding head 3 is adapted to guide the strip electrode 4 about vertically onto the surface of the workpiece 6, see in particular FIG. 2(d), and the metal cored hybrid cladding wire 7 is guided downstream of movement arrow 11 into the weld puddle. A magnetic steering device 14, here comprising two steering magnets 15 adjacent either side of the strip electrode 4, may be provided for steering the weld puddle magnetically. This allows a precise control of the weld puddle, in particular width.

Mechanisms 16 may be provided on the cladding head for adjustment the angle between the strip electrode 4, the metal cored hybrid cladding wire 7, and/or the surface of the workpiece 6, see in particular FIG. 2 (*d*).

A strip wire feeder 17 and a metal cored hybrid cladding wire feeder 18 are preferably attached on or provided adjacent the cladding head.

Figure 3:
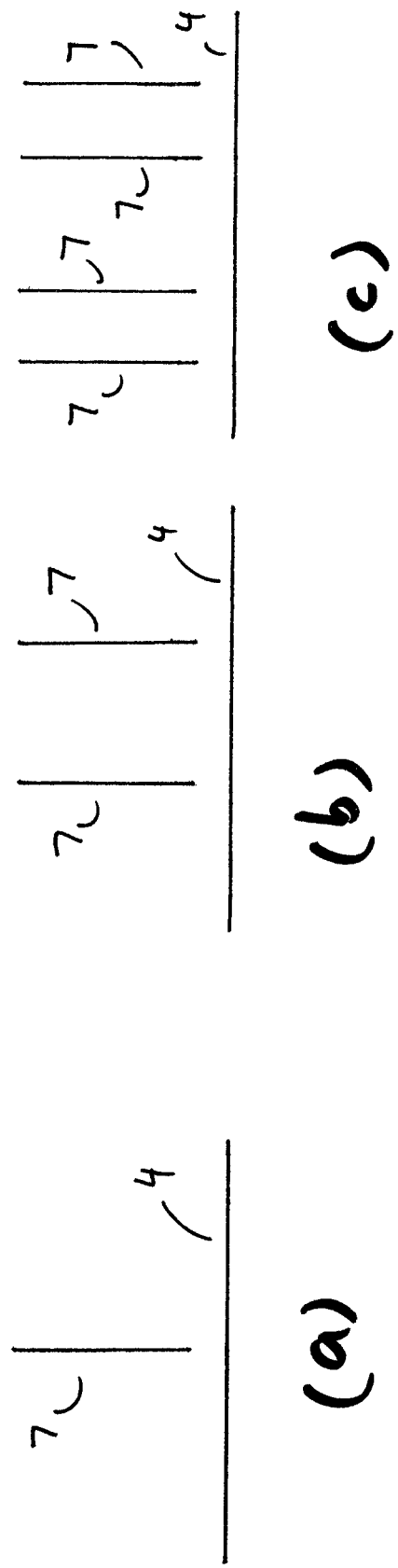
FIGS. 3 (a), (b), (c) illustrate embodiments with one, two and four metal cored hybrid cladding wires, in a view along the arrow 11 of FIG. 1.

The wire 7 is preferably positioned at the centre of the strip electrode, see FIG. 3(*a*). More than one wire 7 can be used, see FIGS. 3(*b*), 3(*c*). If more wires 7 are used, they are preferably identical. However, they may be of different compositions and/or diameters. Ideally, the wires 7 are spaced equidistant across the width of the strip electrode 4 in order to ensure a homogeneous composition of the cladding layer 12, however, they may also be spaced at different distances, e.g. closer towards the edges, see FIG. 3(*c*), or centered as in FIG. 2(*c*).

Wires

In the stainless steel based aspect of the invention, the following metal cored hybrid electroslag cladding wires are used (all figures are wt %, bal=balance):

Wire 308L

|  | C | Mn | Si | S | P | Cr | Ni | Mo | Cu | Fe | All other elements |
|---|---|---|---|---|---|---|---|---|---|---|---|
| Min | 0 | 0.5 | 0 | 0 | 0 | 18.0 | 9.0 | 0 | 0 | 0 | 0 |
| Max | 0.03 | 2.50 | 1.0 | 0.015 | 0.030 | 23.0 | 13.0 | 0.85 | 0.75 | Bal | 0.50 |

Wire 347

|  | C | Mn | Si | S | P | Cr | Ni | Mo | Nb | Cu | Fe | All other elements |
|---|---|---|---|---|---|---|---|---|---|---|---|---|
| Min | 0 | 0 | 0 | 0 | 0 | 18.0 | 9.0 | 0 | 1.0 | 0 | 0 | 0 |
| Max | 0.08 | 2.50 | 1.0 | 0.015 | 0.030 | 23.0 | 13.0 | 0.75 | 5.0 | 0.75 | Bal | 0.50 |

Wire 316L

|  | C | Mn | Si | S | P | Cr | Ni | Mo | Cu | Fe | All other elements |
|---|---|---|---|---|---|---|---|---|---|---|---|
| Min | 0 | 0 | 0 | 0 | 0 | 17.0 | 16.0 | 7.0 | 0 | 0 | 0 |
| Max | 0.04 | 2.50 | 1.0 | 0.015 | 0.030 | 22.0 | 21.0 | 11.0 | 0.75 | Bal | 0.50 |

Wire 317L

|  | C | Mn | Si | S | P | Cr | Ni | Mo | Cu | Fe | All other elements |
|---|---|---|---|---|---|---|---|---|---|---|---|
| Min | 0 | 0 | 0 | 0 | 0 | 18.0 | 18.0 | 10.0 | 0 | 0 | 0 |
| Max | 0.04 | 2.50 | 1.0 | 0.015 | 0.030 | 23.0 | 22.0 | 15.0 | 0.75 | Bal | 0.50 |

In the nickel based aspect of the invention, the following metal cored hybrid electroslag cladding wires are used (all figures are wt %):

Wire 625

|  | C | Mn | Si | S | P | Cr | Ni | Mo | Nb | Cu | Al | Ti | Fe |
|---|---|---|---|---|---|---|---|---|---|---|---|---|---|
| Min | 0 | 0 | 0 | 0 | 0 | 22.0 | 50 | 8.0 | 3.5 | 0 | 0 | 0 | 0 |
| Max | 0.05 | 0.50 | 0.50 | 0.015 | 0.015 | 27.0 | bal | 14.0 | 6.5 | 0.50 | 0.50 | 0.50 | 2.0 |

All other elements <0.50%

Wire 600

|  | C | Mn | Si | S | P | Cr | Ni | Nb | Cu | Ti | Fe |
|---|---|---|---|---|---|---|---|---|---|---|---|
| Min | 0 | 2.0 | 0 | 0 | 0 | 21.0 | 67 | 2.0 | 0 | 0.2 | 0 |
| Max | 0.05 | 5.0 | 0.50 | 0.015 | 0.020 | 26.0 | bal | 5.0 | 0.50 | 0.8 | 3.0 |

All other elements <0.50%

Wire 825

| | C | Mn | Si | S | P | Cr | Ni | Mo | Cu | Al | Ti | Fe |
|---|---|---|---|---|---|---|---|---|---|---|---|---|
| Min | 0 | 0 | 0 | 0 | 0 | 24.0 | 46 | 2.0 | 1.0 | 0 | 0.8 | 0 |
| Max | 0.05 | 1.0 | 0.50 | 0.015 | 0.020 | 27.0 | 52 | 14.0 | 4.0 | 0.20 | 1.6 | Bal |

All other elements <0.50%

Wire 400

| | C | Mn | Si | S | P | Ni | Cu | Al | Ti | Fe |
|---|---|---|---|---|---|---|---|---|---|---|
| Min | 0 | 0 | 0 | 0 | 0 | 62.0 | 28.0 | 0 | 0 | 0 |
| Max | 0.15 | 4.0 | 1.2 | 0.015 | 0.020 | 68.0 | 36.0 | 0.75 | 1.2 | 2.5 |

All other elements <0.50%

Method

The cladding system is operated according to the following method. First, a workpiece to be cladded is provided. Then, a strip electrode is guided onto the surface of the workpiece. The strip electrode is cladded onto the surface of the workpiece using electroslag cladding, while a metal cored hybrid cladding wire is heated and guided into the weld puddle of the strip electrode.

When cladding nickel based workpieces, a combination of a strip electrode and metal cored hybrid electroslag cladding wire is used to obtain the desired final chemistry of the cladding. When cladding stainless steel based workpieces, a standard strip electrode can be used for different workpiece compositions, and only the metal cored hybrid electroslag cladding wire will be varied to achieve the desired cladding composition. Preferred wire compositions are specified in the preceding section.

It is preferred to make the following combinations:

| Nickel Base | metal cored hybrid electroslag cladding wire | strip electrode | Flux |
|---|---|---|---|
| Alloy 625 | Wire 625 | Typical 625 Strip | Flux A |
| Alloy 600 | Wire 600 | Typical 600 Strip | Flux A |
| Alloy 825 | Wire 825 | Typical 825 Strip | Flux A |
| Alloy 400 | Wire 400 | Typical 400 Strip | Flux A |

The preferred Flux A is an Electro Slag High speed flux with $Al_2O_3+CaF_2 > 73$ wt % without any intended metallic addition. Other flux compositions may work as well, but with inferior performance. The strip is preferably a standard strip.

| Stainless Steel Base | metal cored hybrid electroslag cladding wire | strip electrode | Flux |
|---|---|---|---|
| 308L | Wire 308L | Typical 18Cr—8Ni Strip | Flux B |
| 347 | Wire 347 | Typical 18Cr—8Ni Strip | Flux B |
| 316L | Wire 316L | Typical 18Cr—8Ni Strip | Flux B |
| 317L | Wire 317L | Typical 18Cr—8Ni Strip | Flux B |

The preferred Flux B is an Electro Slag High speed flux with $Al_2O_3+CaF_2 > 81$ wt % without any intended metallic addition. Other flux compositions may work as well, but with inferior performance. The strip is preferably a typical 18Cr-8Ni Strip.

The speed of movement of the cladding head 3 is preferably about 27 cm/min for Ni alloys and about 33 cm/min for stainless steel alloys, and the cladding layer thickness is preferably about 5 mm.

Preferred Embodiment

Various different embodiments and individual aspects of the invention have been described above. They may be combined in any way. In a preferred embodiment, the invention provides a cladding head in which the strip electrode is fed essentially vertically onto the workpiece and the metal cored hybrid wire is fed in an adjustable angle relative thereto as indicated in FIG. 2. A magnetic steering device is provided in the preferred embodiment as are a PLC controller, configured to control stick out length of the strip and/or metal cored hybrid electroslag wire(s) and the feed speeds of the metal cored hybrid electroslag wire(s) and the strip electrode, as well as the heat provided to the metal cored hybrid electroslag wire(s). In the preferred embodiment, a single layer of cladding is deposited on the workpiece with a high speed and homogenous and uniform cladding chemistry according to the required grade.

Further Embodiments

Although only a few embodiments of this invention have been described above, it should be appreciated that many modifications can be made without departing from the spirit and scope of the invention. All such modifications are intended to be included within the scope of this invention, which is to be limited only by the following claims.

REFERENCE NUMERALS 1 hybrid electroslag cladding system
2 flux feeder
3 cladding head
4 strip electrode
5 cladding power supply
6 workpiece
7 metal cored hybrid electroslag cladding wire
8 hot wire power supply
9 weld puddle
10 flux
11 arrow
12 cladding layer
13 controller
14 magnetic steering device
15 steering magnet
16 metal cored wire feeding mechanism
17 strip wire feeder
18 metal cored hybrid electroslag cladding wire feeder

The invention claimed is:

1. A hybrid electroslag cladding method, the method comprising:
   providing a workpiece to be cladded;
   guiding a strip electrode onto a surface of the workpiece;
   cladding the strip electrode onto the surface of the workpiece using electroslag cladding; and
   guiding a metal cored hybrid electroslag cladding wire into a weld puddle of the strip electrode for controlling a chemical composition of the cladding, and
   for a second workpiece requiring stainless steel cladding with a different cladding composition than the workpiece, selecting a second metal cored hybrid electroslag cladding wire for controlling a chemical composition of the cladding of the second workpiece,
   wherein the chemical composition of the metal cored hybrid electroslag cladding wire differs from the chemical composition of the second metal cored hybrid electroslag cladding wire.

2. The method of claim 1, further comprising:
   using a flux of a given composition for the workpiece and the second workpiece.

3. The method of claim 1, further comprising:
   controlling at least one of a stickout length of the metal cored hybrid electroslag cladding wire, a feed speed of the strip electrode, and a feed speed of the metal cored hybrid electroslag cladding wire.

4. The method of claim 3, wherein the feed speed of the metal cored hybrid electroslag cladding wire is changed if a change of the feed speed of the strip electrode is detected.

5. The method of claim 1, wherein the metal cored hybrid electroslag cladding wire is heated.

6. The method of claim 1, wherein the metal cored hybrid electroslag cladding wire includes a stainless steel base sheath and a metal powder flux within the stainless steel base sheath, and
   wherein the wire has a composition that is defined by WIRE 308L, WIRE 347, WIRE 316L, or WIRE 317L.

7. The method of claim 6, wherein for the metal cored hybrid electroslag cladding wire an upper limit of at least one element in the composition is one of 5%, 10% or 20% lower than that defined in the respective WIRE 308L, WIRE 347, WIRE 316L, or WIRE 317L.

8. The method of claim 6, wherein for the metal cored hybrid electroslag cladding wire a lower limit of at least one element in the composition is one of 5%, 10% or 20% higher than that defined in the respective WIRE 308L, WIRE 347, WIRE 316L, or WIRE 317L.

9. A hybrid electroslag cladding system, comprising:
   a cladding head for guiding a strip electrode onto a surface of a workpiece to be cladded with the strip electrode;
   a cladding power supply for providing power to the strip electrode for arcless deposition onto the surface of the workpiece; and
   a flux feeder for at least one of depositing flux on the strip electrode and depositing flux adjacent the strip electrode,
   wherein the cladding head is configured to guide a metal cored hybrid electroslag cladding wire into a weld puddle of the strip electrode,
   wherein the metal cored hybrid electroslag cladding wire has a composition that is defined by one of WIRE 625, WIRE 600, WIRE 825, WIRE 400, WIRE 308L, WIRE 347, WIRE 316L, or WIRE 317L, and
   wherein the hybrid electroslag cladding system further comprises a steering magnet disposed adjacent the strip electrode for steering the weld puddle magnetically.

10. The system of claim 9, further comprising:
    a hot wire power supply for heating the metal cored hybrid electroslag cladding wire; and
    a controller for controlling at least one of a temperature of the metal cored hybrid electroslag cladding wire according to a desired deposition rate, a stickout length of at least one of the metal cored hybrid electroslag cladding wire the and the strip electrode, a feed speed of the strip electrode, and a feed speed of the metal cored hybrid electroslag cladding wire.

11. The system of claim 9, wherein an angle between at least one of the strip electrode and the metal cored hybrid electroslag cladding wire and the surface of the workpiece is adjustable.

12. The system of claim 9, wherein the cladding head guides at least two metal cored hybrid electroslag cladding wires disposed adjacent to each other into the weld puddle.

* * * * *